United States Patent
Håland et al.

(10) Patent No.: US 6,938,953 B2
(45) Date of Patent: Sep. 6, 2005

(54) VEHICLE SEAT

(75) Inventors: Yngve Håland, Falsterbo (SE); Anders Svantesson, Tollered (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/466,596

(22) PCT Filed: Jan. 23, 2002

(86) PCT No.: PCT/SE02/00101

§ 371 (c)(1),
(2), (4) Date: Nov. 13, 2003

(87) PCT Pub. No.: WO02/058959

PCT Pub. Date: Aug. 1, 2002

(65) Prior Publication Data

US 2004/0070240 A1 Apr. 15, 2004

(30) Foreign Application Priority Data

Jan. 23, 2001 (GB) ............................................. 0101731
May 16, 2001 (GB) ............................................. 0111982

(51) Int. Cl.[7] .......................... B60N 2/427; B60R 21/00
(52) U.S. Cl. ............................ 297/216.14; 297/216.12
(58) Field of Search ...................... 297/216.14, 216.12

(56) References Cited

U.S. PATENT DOCUMENTS

| | | | | |
|---|---|---|---|---|
| 3,802,737 A | | 4/1974 | Mertens ............. | 297/216.12 X |
| 5,378,043 A | * | 1/1995 | Viano et al. ......... | 297/216.12 X |
| 5,795,019 A | * | 8/1998 | Wieclawski ............ | 297/216.12 |
| 5,836,648 A | * | 11/1998 | Karschin et al. ....... | 297/216.14 |
| 5,927,804 A | * | 7/1999 | Cuevas .................. | 297/216.12 |
| 5,934,750 A | | 8/1999 | Föhl ...................... | 297/216.12 |
| 6,017,086 A | * | 1/2000 | Meyer et al. .......... | 297/216.12 |
| 6,019,424 A | * | 2/2000 | Ruckert et al. ......... | 297/216.12 |
| 6,022,074 A | * | 2/2000 | Swedenklef ............ | 297/216.14 |
| 6,024,406 A | * | 2/2000 | Charras et al. ......... | 297/216.14 |
| 6,109,692 A | * | 8/2000 | Håland et al. ....... | 297/216.14 X |
| 6,199,947 B1 | | 3/2001 | Wiklund ................ | 297/216.12 |
| 6,250,714 B1 | * | 6/2001 | Nakano et al. ......... | 297/216.12 |
| 6,273,511 B1 | * | 8/2001 | Wieclawski ......... | 297/216.12 X |
| 6,352,285 B1 | | 3/2002 | Schulte et al. ...... | 297/216.12 X |
| 6,375,262 B1 | * | 4/2002 | Watanabe ........... | 297/216.12 X |
| 6,474,733 B1 | * | 11/2002 | Heilig et al. ............ | 297/216.12 |
| 6,550,865 B2 | * | 4/2003 | Cho .................... | 297/216.12 X |
| 6,565,150 B2 | * | 5/2003 | Fischer et al. ......... | 297/216.12 |
| 6,604,788 B1 | * | 8/2003 | Humer ............... | 297/216.12 X |
| 6,631,949 B2 | * | 10/2003 | Humer et al. .......... | 297/216.12 |
| 6,631,955 B2 | * | 10/2003 | Humer et al. ....... | 297/216.12 X |
| 6,655,733 B2 | * | 12/2003 | Humer et al. .......... | 297/216.12 |
| 6,692,071 B2 | * | 2/2004 | Fowler .................. | 297/216.12 |
| 6,702,377 B2 | * | 3/2004 | Nakano ................. | 297/216.12 |
| 6,719,368 B1 | * | 4/2004 | Neale .................... | 297/216.14 |
| 6,749,256 B1 | * | 6/2004 | Klier et al. ............. | 297/216.12 |
| 2002/0050729 A1 | * | 5/2002 | Nakano ................. | 297/216.12 |
| 2003/0001414 A1 | * | 1/2003 | Humer et al. .......... | 297/216.12 |
| 2003/0011224 A1 | * | 1/2003 | Humer et al. .......... | 297/216.12 |
| 2003/0015897 A1 | * | 1/2003 | Humer et al. .......... | 297/216.12 |
| 2003/0015898 A1 | * | 1/2003 | Breed .................... | 297/216.12 |
| 2003/0122410 A1 | * | 7/2003 | Fischer et al. ......... | 297/216.12 |
| 2004/0119324 A1 | * | 6/2004 | Humer et al. .......... | 297/216.12 |

FOREIGN PATENT DOCUMENTS

| | | |
|---|---|---|
| EP | 0 627 340 | 10/1997 |
| EP | 1 026 029 | 8/2000 |
| EP | 1 029 736 | 8/2000 |
| GB | 1 265 875 | 8/1969 |
| GB | 2 316 862 | 3/1998 |
| JP | 11 34708 | 5/1989 |
| WO | WO-98/09838 | 3/1998 |

* cited by examiner

*Primary Examiner*—Rodney B. White
(74) *Attorney, Agent, or Firm*—Madson & Metcalf

(57) ABSTRACT

A vehicle seat has a back-rest (1) carrying a head-rest (2). A mechanism is provided to move the head-rest (2) forwardly relative to the back-rest (1) in response to a rear impact situation. An element (9) is operatively located between the head-rest (2) and the mechanism (6) which is adapted to yield when exposed to a force in excess of a predetermined force. Thus the force that can be applied by the head-rest (2) to a head (8) of an occupant of the seat, is limited to be a maximum of 200 Newtons, with the preferred value being 100 Newtons.

18 Claims, 2 Drawing Sheets

VEHICLE SEAT

BACKGROUND OF THE INVENTION

1. Field of the Invention

THE PRESENT INVENTION relates to a vehicle seat.

2. Description of Related Art

It has been proposed in U.S. Pat. No. 5,378,043 to provide a vehicle seat with a headrest that moves forwardly in the event that a rear impact should occur to minimise the risk of whiplash injuries occurring. The headrest is mounted on upright support bars that are pivotally connected to the upper part of the frame of the backrest of the seat, and which are also connected to a pressure plate which is within the backrest of the seat. In a rear impact situation, when the driver is in a typical position with his head spaced in front of the headrest, initially the torso of the driver will move rearwardly pressing his torso into the backrest of the seat and the pressure plate will thus move rearwardly causing the headrest to move forwardly to 'catch' the head of the driver. The head and torso will then be accelerated at the same rate, thus minimising the risk of whiplash injury.

If, however, the head of the driver is close to the headrest when the rear impact occurs, the headrest will impart a substantial forward acceleration to the head of the driver as the torso of the driver moves rearwardly into the seat-back, which may serve to increase the risk of the driver being injured.

SUMMARY OF THE INVENTION

The present invention seeks to provide an improved vehicle seat.

According to this invention there is provided a vehicle seat having a headrest mounted on the backrest of the seat, there being a mechanism adapted to move the headrest forwardly relative to the backrest in response to a rear impact situation, there being means operatively located between the headrest and the mechanism adapted to yield when exposed to a force in excess of a predetermined force to limit the force applied to the headrest by said mechanism and thus to limit the force that can be applied by the headrest to a head to be a maximum of 200 Newtons.

Preferably the headrest is pivotally mounted on the backrest of the seat and is moved forward in response to pressure applied to a pressure plate within the back of the seat.

Conveniently the headrest is mounted on the upper part of at least one support rod which is pivotally mounted on the backrest of the seat and wherein the pressure plate is on the lower part of the support rod, the said means comprising a yieldable joint between the upper and lower parts of the support rod.

In one embodiment the joint comprises a sleeve interconnecting separate upper and lower parts of the support rod.

Preferably the said means comprise a plastically deformable member.

Alternatively said means comprise a resiliently deformable member.

In another embodiment the joint is a pivotal joint with an associated plastically deformable link, the link being connected to the upper and lower parts of the support rod to maintain the joint in an initial condition and which can yield to permit the joint to bend.

In a further embodiment the yieldable joint is a deformed part of the support rod between the upper and lower parts thereof.

Conveniently a blocking element or latch is provided to lock the headrest in a forward position after the forward movement has been effected.

Preferably means are provided to permit rearward movement of the headrest with an energy absorbing effect after said locking.

In this specification the term support rod is used to mean any support element, regardless of the precise shape or cross section thereof.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figures 1, 2:
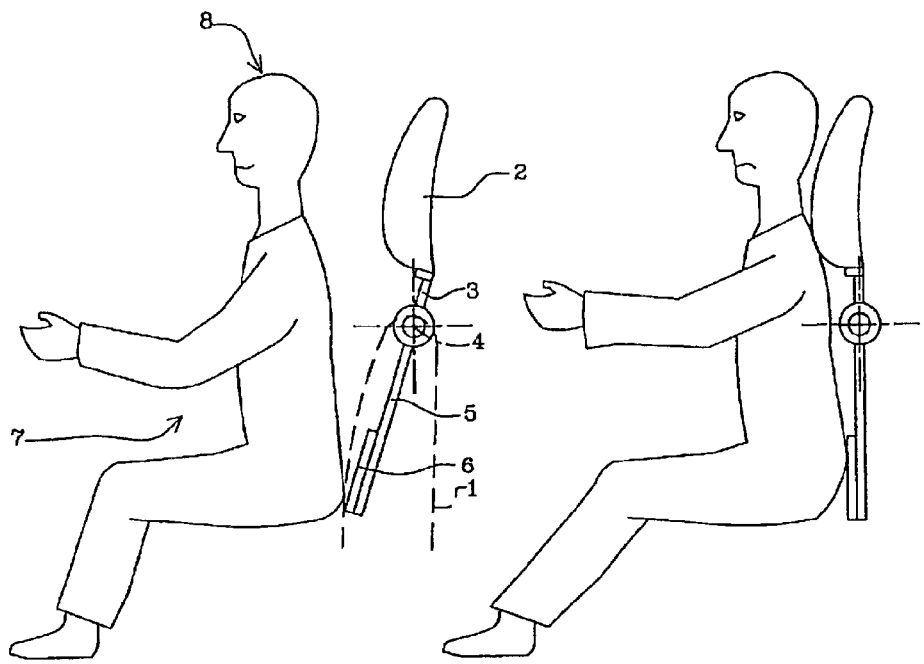
FIG. 1 is a diagrammatic side view of the essential parts of a vehicle seat in accordance with the invention and an occupant of the seat in a first condition.
FIG. 2 is a view corresponding to FIG. 1 showing the essential parts of the seat and the occupant in a second condition.

Referring initially to FIG. 1 a vehicle seat has a backrest 1, which is shown in phantom in FIG. 1 but which is omitted from the remaining drawings. Mounted on the backrest 1 is a headrest 2. The headrest is supported by the upper part of one or two generally upright support rods 3. (Only one rod is shown in the drawings.) The or each support rod is pivotally connected, by a pivotal connection 4, to the frame member provided in the backrest 1. The connection 4 may include a biasing spring which biases the headrest with a clockwise rotation (as seen in FIG. 1) to the position shown in FIG. 1.

The support rod includes a lower part 5 that extends below the pivotal connection 4 within the backrest of the seat, where it is connected to a pressure plate 6 that is adapted to move rearwardly, within the seat back, when the torso of an occupant 7 of the seat moves rearwardly, relative to the back of the seat in a rear impact situation.

As shown in FIG. 1 the occupant 7 has an initial position with his head 8 spaced in front of the headrest 2. In a rear impact situation the torso of the occupant will move relative to the backrest and will engage the pressure plate 6 to move the headrest with an anti-clockwise rotation against the bias provided by the biasing spring to the position shown in FIG.

2 in which it 'catches' the head of the occupant 7 to minimise the risk of whiplash injury.

Figures 3, 4:
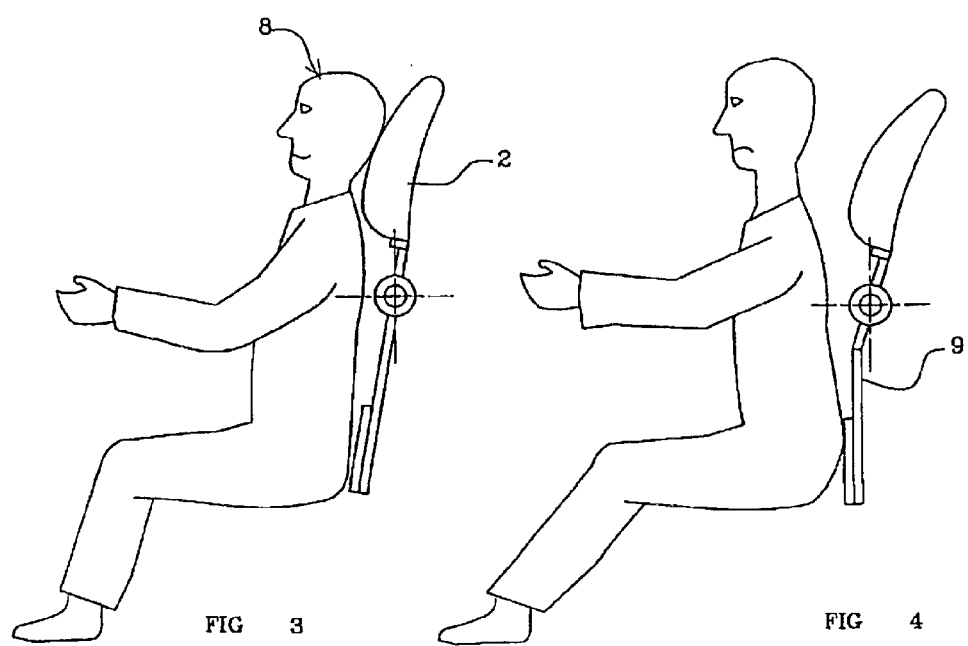
FIG. 3 is a view corresponding to FIG. 1 showing the essential parts of the seat and the occupant in a further condition.
FIG. 4 is a view corresponding to FIG. 1 showing the essential parts of the seat and the occupant in a further condition.

Referring now to FIG. 3 the occupant of the seat is shown in an initial position with his head 8 immediately in front of the headrest 2, with no space between the head and the headrest. If a rear impact occurs while the seat occupant is in this position a rearward force is applied to the pressure plate 6, tending to rotate the combination of the pressure plate 6 and the headrest 2 in an anti-clockwise direction. A force is thus applied to the headrest, and the headrest applies a force to the head.

It is to be understood that in the described embodiments of the invention the upper part of the support rod is connected to the lower part of the support rod by a relatively weak, and thus yieldable, joint 9, which in the embodiment illustrated is beneath the pivotal connection 4. The joint is designed to yield when the force applied by the headrest to the head (and thus when the equal and opposite force is applied by the head to the headrest) exceeds a predetermined limit. The maximum value of the limit is 200 Newtons, and a more preferred value is 100 Newtons. As a consequence the acceleration that will be imparted to a typical head, having a weight of 5 kg will be 4 g or less, and the risk of injury being caused by rapid forward acceleration of the head is minimised.

As can be seen in FIG. 4 the yieldable joint has deformed, and thus the pressure plate 6 is able to move rearwardly without a substantial forward movement of the headrest 2. The yieldable joint is adapted to yield when a force is applied which is in excess of a predetermined force.

Figure 5:
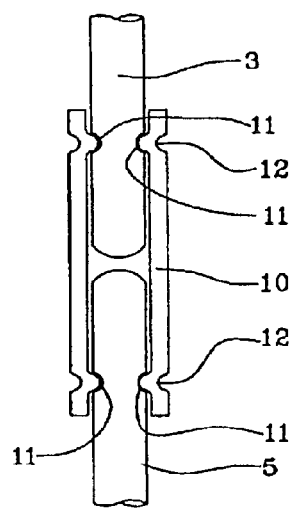
FIG. 5 is an enlarged view of part of one embodiment of the invention.

FIG. 5 shows one embodiment of the invention where the upper part 3 and the lower part 5 of the support rod are separate elements of generally cylindrical or rod-like form which are interconnected by a sleeve 10 which engages the adjacent ends of the parts 3 and 5 of the support rod. The sleeve may be of a yieldable material, and may be of metal or plastics or rubber. In one embodiment of the invention the tube will yield resiliently. The tube will absorb energy while yielding, and will return to its initial condition automatically when the accident situation has finished. In an alternative embodiment of the invention, the tube may yield plastically, so that, once the sleeve has yielded it maintains its new configuration. The tube will absorb energy as it yields, and there is no risk that the headrest will move forwardly again under resilient forces which might give a "bouncing" effect with the head of the seat occupant. The ends of the parts 3 and 5 of the support rod are provided with dimples or apertures 11, or even with a circumferential groove, and the sleeve is provided with corresponding dimples 12 which engage the formations on the parts 3 and 5 of the support rod so that the sleeve secures the two parts of the support rod together to form the yieldable joint 9.

Figure 6:
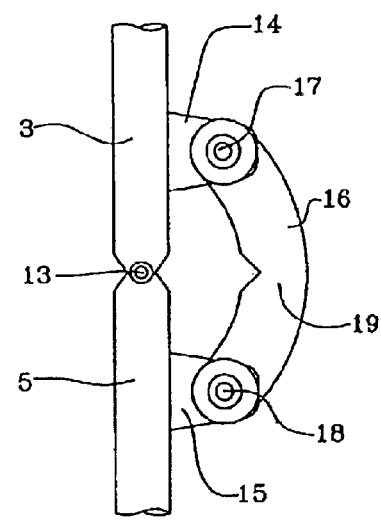
FIG. 6 is an enlarged view of part of another embodiment of the invention.

FIG. 6 shows a further embodiment of the invention in which the upper part 3 of the support rod is pivotally connected to the lower part 5 of the support rod by a pivotal connection 13. An apertured lug 14 projects from the upper part 3 and a corresponding apertured lug 15 extends, in alignment with the lug 14, from the lower part 5. An arcuate link 16 is pivotally connected to the lug 14 by a pin 17 and to the lower lug 15 by a pin 18. The edge of the central part of the link 16 is recessed 19, so that the link is inherently weak. If a substantial force is applied, tending to move the upper end of the upper support rod part 3 and the lower end of the lower support rod part 5 towards the right as shown in FIG. 6 the link 16 will buckle when a predetermined threshold of force is exceeded, so that the pivot 13 then acts as a yielding joint. The link will be plastically deformed, whilst absorbing energy. The link 16 thus acts to maintain the join in an initial condition but is adapted to yield to permit the joint to bend.

Figure 7:
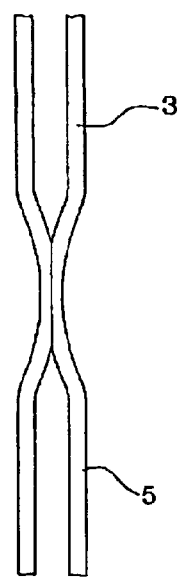
FIG. 7 is an enlarged view of part of another embodiment of the invention.
Figure 8:
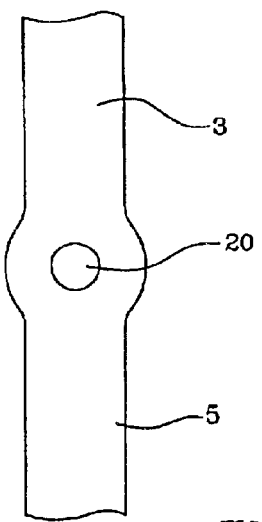
FIG. 8 is a further view of the part of the embodiment shown in FIG. 7 and, FIG. 9 is a diagrammatic view of part of a modified embodiment of the invention.

FIGS. 7 and 8 show another embodiment in which the support rod is of tubular form, but a region of the support rod between the upper part 3 and the lower part 5 has been substantially flattened, for example by compressing the support rod between two presses that exert a force between two small opposed circular areas 20 on opposite sides of the rod. When the rod has been deformed in this way the deformed region will constitute a weakened yieldable joint between the upper part 3 and the lower part 5 of the support rod. When subjected to a predetermined force the yieldable joint will yield within a plastic deformation.

Figure 9:
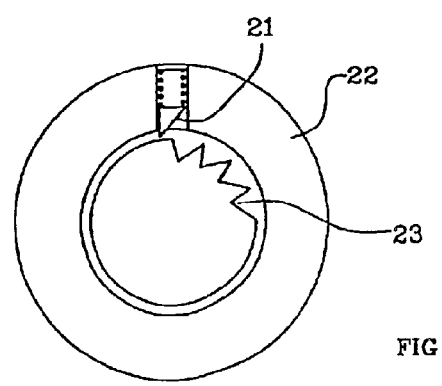

In embodiments of the invention a blocking element or latch arrangement may be provided to lock the headrest in a forward position when the headrest has been moved forwardly in the manner described above during a rear impact, and the blocking element or latch may operate regardless of whether the yieldable joint in the support rod has or has not yielded. The blocking element or latch may be in the form of a spring biased ratchet 21 contained within a bearing housing 22 of the pivotal connection 4 as shown in FIG. 9, which can act on a serrated part 23 of the pivotal connection 4 after it has executed a predetermined movement. A mechanism may be provided to release the blocking element or latch to permit the headrest to return to its initial position following conclusion of the rear impact. The blocking mechanism or latch may, however, be modified so that when the blocking member or latch has been actuated, for example when the headrest has moved forwardly by a predetermined amount, the headrest may move rearwardly with a load limiting or energy absorbing effect—at least with a predetermined distance of movement. Thus the housing 22 may itself rotate or move against a resistive force that provides a load limiting effect, or the support rods 3 may be yieldable.

In the present Specification "comprises" means "includes or consists of" and "comprising" means "including or consisting of".

What is claimed is:

1. A vehicle seat comprising a headrest mounted on a backrest of the seat, there being a mechanism adapted to move the headrest forwardly relative to the backrest in response to a rear impact situation, there being means operatively located between the headrest and the mechanism, said means being adapted to yield when exposed to a first force in excess of a predetermined force to limit a second force applied to the headrest by said mechanism and thus to limit a third force that can be applied by the headrest to a head to be a maximum of 200 Newtons.

2. A vehicle seat according to claim 1 wherein the headrest is pivotally mounted on the backrest of the seat and is moved forward in response to pressure applied to a pressure plate within a back of the seat.

3. A vehicle seat according to claim 2 wherein the headrest is mounted on an upper part of at least one support rod which is pivotally mounted on the backrest of the seat and wherein the pressure plate is on a lower part of the at least one support rod, the said means comprising a yieldable joint between the upper and lower parts of the at least one support rod.

4. A vehicle seat according to claim 3 wherein the joint is a pivotal joint with an associated plastically deformable link, the link being connected to the upper and lower parts of the at least one support rod to maintain the pivotal joint in an initial condition and which can yield to permit the pivotal joint to bend.

5. A vehicle seat according to claim 3 wherein the yieldable joint is a deformed part of the at least one support rod between the upper and lower parts thereof.

6. A vehicle seat according to claim 3 wherein the joint comprises a sleeve interconnecting separate upper and lower parts of the at least one support rod.

7. A vehicle seat according to claim 1 wherein the said means comprise a plastically deformable member.

8. A vehicle seat according to claim 1 wherein the said means comprise a resiliently deformable member.

9. A vehicle seat according to claim 1 wherein a blocking element or latch is provided to lock the headrest in a forward position after the forward movement has been effected.

10. A vehicle seat according to claim 9 wherein means are provided to permit rearward movement of the headrest with an energy absorbing effect after said locking.

11. A vehicle seat, comprising:
 a headrest pivotally mounted on a backrest of the seat;
 a pressure plate within a back of the seat that can move the headrest forwardly relative to the backrest in response to a rear impact situation; and
 a yieldable joint operatively located between the headrest and the pressure plate, the yieldable joint yielding when exposed to a first force in excess of a predetermined force to limit a second force applied to the headrest by the pressure plate and thus to limit a third force that can be applied by the headrest to a head of an occupant to be a maximum of 200 Newtons.

12. The vehicle seat of claim 11, wherein the headrest is mounted on an upper part of at least one support rod pivotally mounted on the backrest of the seat and the pressure plate is mounted on a lower part of the at least one support rod, the yieldable joint being located between the upper and lower parts of the at least one support rod.

13. The vehicle seat of claim 12, wherein the yieldable joint is a pivotal joint with an associated plastically deformable link, the link being connected to the upper and lower parts of the at least one support rod to maintain the pivotal joint in an initial condition which can yield to permit the pivotal joint to bend.

14. The vehicle seat of claim 12, wherein the yieldable joint is a deformed part of the at least one support rod between the upper and lower parts thereof.

15. The vehicle seat of claim 11, wherein the yieldable joint is plastically deformable.

16. The vehicle seat of claim 11, wherein the yieldable joint is resiliently deformable.

17. The vehicle seat of claim 11, wherein a blocking element is provided to lock the headrest in a forward position after the headrest has been moved forwardly.

18. The vehicle seat of claim 17, further comprising a release mechanism to permit rearward movement of the headrest with an energy absorbing effect after the headrest has been locked.

* * * * *